United States Patent [19]

Shinmyo

[11] 4,380,814
[45] Apr. 19, 1983

[54] BASEBAND DATA SWITCHING APPARATUS FOR DIGITAL COMMUNICATIONS SYSTEM

[75] Inventor: Saburo Shinmyo, Tokyo, Japan

[73] Assignee: Nippon Electric Co., Ltd., Tokyo, Japan

[21] Appl. No.: 195,686

[22] Filed: Oct. 9, 1980

[30] Foreign Application Priority Data

Oct. 9, 1979 [JP] Japan ................. 54-130133

[51] Int. Cl.³ ............................................. H04B 7/08
[52] U.S. Cl. ..................................... 375/40; 375/100; 455/132
[58] Field of Search ................... 375/40, 100; 455/132, 455/133, 139, 140; 371/67, 68; 340/147 C

[56] References Cited

U.S. PATENT DOCUMENTS 3,500,319 12/1967 Duuren et al. ................. 375/40
4,035,728 7/1977 Ishikawa et al. ............... 455/132
4,270,210 5/1981 Tan et al. ..................... 375/100

Primary Examiner—Benedict V. Safourek
Assistant Examiner—Stephen Chin
Attorney, Agent, or Firm—Sughrue, Mion, Zinn, Macpeak and Seas

[57] ABSTRACT

A baseband switching device for switching between first and second redundant channels is provided with the capability of adjusting the phase and polarity of the data signals in each channel to be equal so that data will continue without interruption when switching from one channel to another.

8 Claims, 9 Drawing Figures

FIG.1
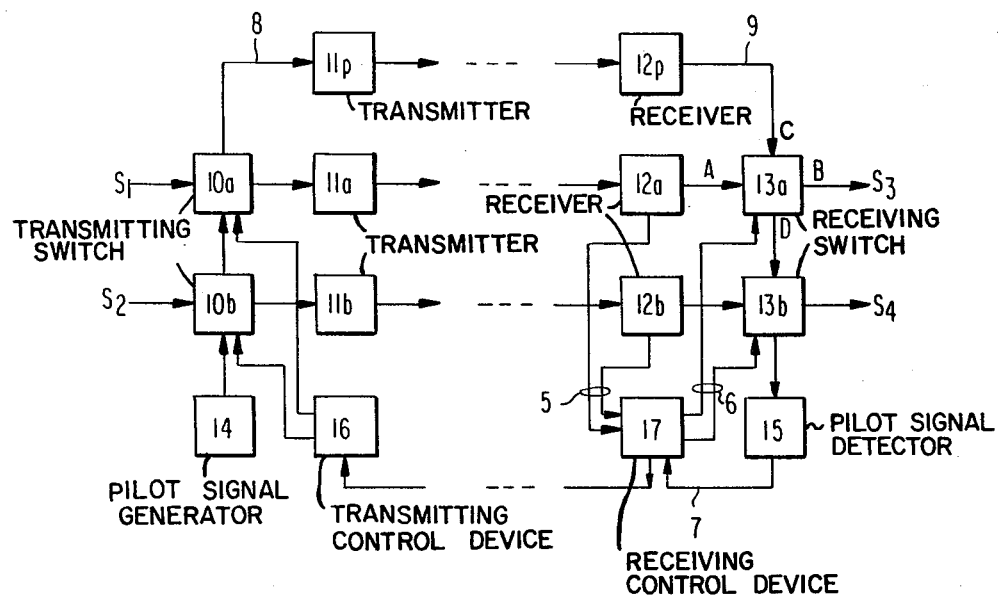
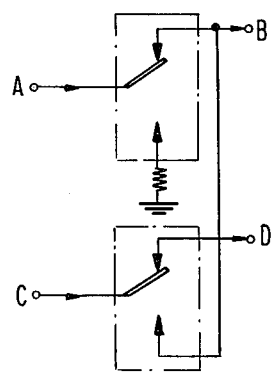
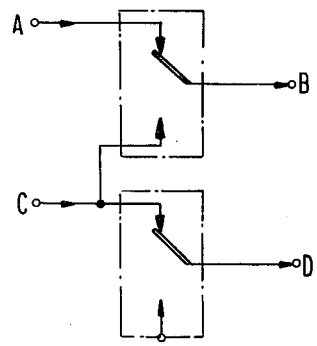
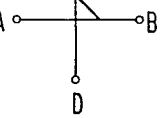
FIG.2A  FIG.2C  FIG.2B

BASEBAND DATA SWITCHING APPARATUS FOR DIGITAL COMMUNICATIONS SYSTEM

BACKGROUND OF THE INVENTION

The present invention relates to a switching apparatus for use in a digital communications system having one standby channel for N regular channels (1:N, where N is a positive integer).

Such a system having a 1:N channel configuration is used for improvement of system reliability. When one of the N regular channels is faulty, the system switches that faulty channel over to the standby channel. For further details of such a system, reference is made to a paper entitled "A 6 GHz RADIO FOR TELEPHONY APPLICATIONS," by E. Takeuchi et al., 1976 International Conference on Communications, Vol. II, June 14–16, published by the IEEE.

In this switching operation, a switchover is required without a data hit, i.e. without loss of data, which may cause serious problems such as a collapse in frame synchronization, which affects the synchronized state of the communication system as a whole. This hitless switching operation, however, is practically impossible if a fault exists in a radio-linked section because an enormous memory capacity is required for storing data corresponding to the time to detect the fault and complete the protection switching. While it may thus be impractical to avoid all loss of data, the elimination of those data hits that have resulted from the maintenance actions themselves have been given consideration. This means that in the maintenance actions a transmitting signal of a regular channel would be transmitted to the standby channel by activating a transmitting switch in the regular channel, and a receiving switch at the receiving end would switch from the regular channel to the standby channel or vice versa, all without any data hit.

The receiving switchover apparatus generally comprises relays having a high reliability and fail-safe function so as not to shut down the outputs of both the regular and standby channels even during the power source breakdowns. In this case, if the non-bridge type relays are used for both channels, there occurs a period during which the output becomes completely shut off because of the different operating time for the two relays, thereby causing disruptions for the succeeding equipment as discussed before. Accordingly, the use of a bridge type relay can eliminate the period during which the signals become shut off.

However, there still remain difficulties with a switching apparatus employing the bridge type relay since the bipolar code format is used for relaying signals between radio-linked section equipment and multiplexer/demultiplexer equipment and the output polarities of the two channels may become different from each other even though the signals are identical. In other words, even with the bridge type relay, if the codes of the two signals of the regular and standby channels are of opposite polarities, they may cancel each other. Accordingly, it is necessary to control the polarity of the bipolar codes for both regular and standby channels in order to effectively achieve a hitless switching operation. This at the same time requires the adjustment of the propagation time lags for both channels to achieve synchronization.

SUMMARY OF THE INVENTION

An object of the present invention is to provide a baseband switching apparatus which facilitates synchronization of time lags and polarities and switching over of the regular standby channel without any data hit.

According to the present invention, there is provided a baseband data switching apparatus for switching a first and a second channels, each channel having means for receiving baseband unipolar data and clock recovering means for recovering a clock from said baseband unipolar data, the switching apparatus comprising: first and second data phase adjusting means (301–303, 305) respectively connected to the outputs of each of the data demodulating means in the first and second channels for respectively adjusting the phases of the baseband unipolar data in each channel in synchronism with the respective recovered clock; first and second clock phase adjusting means (304) respectively connected to the outputs of each of the clock recovering means for respectively adjusting the phases of the recovered clocks; first (106) and second (206) unipolar/bipolar conversion means respectively connected to the first and second phase adjusting means and to said first and second clock phase adjusting means for respectively converting the phase-adjusted baseband unipolar data into bipolar data in response to first and second control signals; first (104) and second (204) frequency divider means respectively connected to the first and second clock phase adjusting means for respectively dividing the frequencies of the phase adjusted and recovered clocks; first (105) and second (205) control signal supply means for respectively reversing the polarities of the outputs of the first and second frequency divider means in response to third (f) and fourth (f') control signals to provide the first and second control signals; coincidence detecting means for detecting coincidence or non-coincidence between the outputs from said first and second unipolar signal means; and means for selectively switching between the outputs of the first and second unipolar/bipolar conversion means.

BRIEF DESCRIPTION OF THE DRAWINGS

The features and advantages of the present invention will be described in further detail referring to the accompanying drawings, in which:

FIG. 1 is a schematic block diagram showing the switching system, having one standby channel for 2 regular channels, according to the present invention;

FIGS. 2A and 2B show structures of non-bridge type and bridge type relays, respectively;

FIG. 2C shows a schematic circuit diagram of receiving switches 13a and 13b in FIG. 1;

DETAILED DESCRIPTION OF THE PREFERRED EMBODIMENTS

Figure 3:
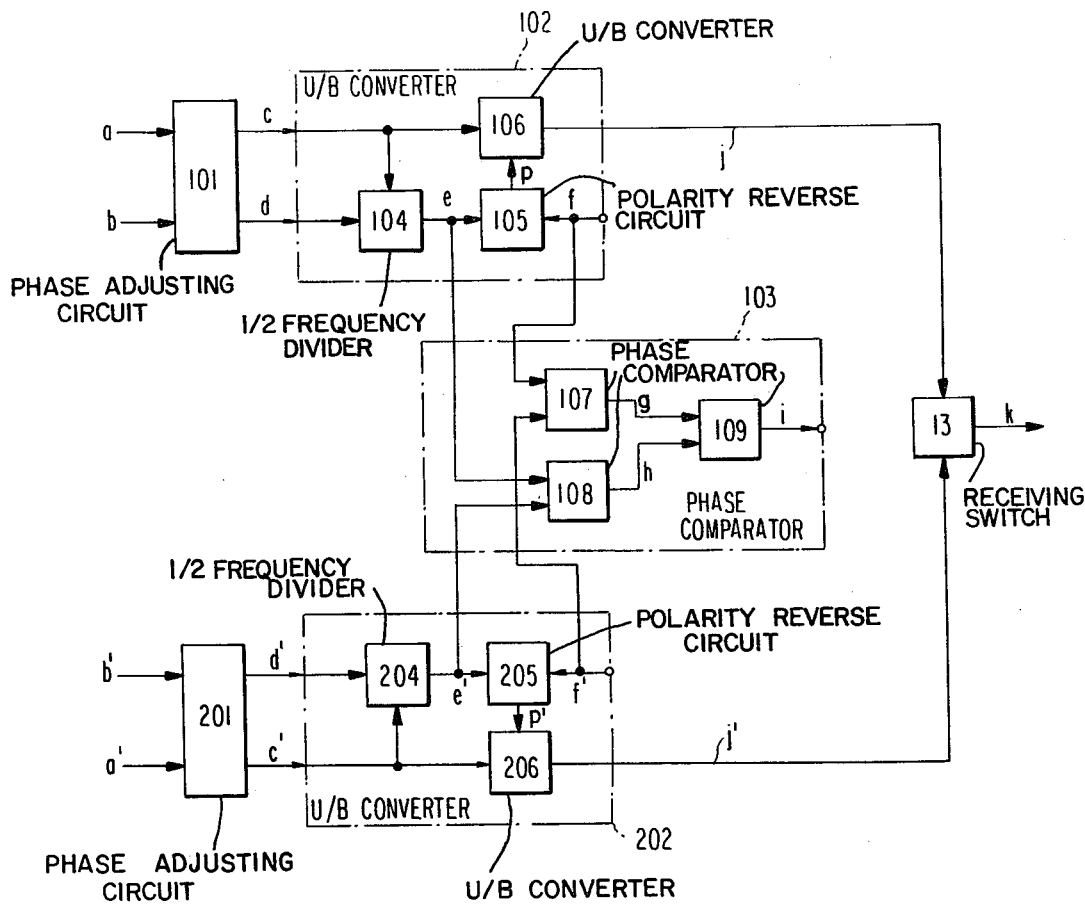
FIG. 3 is a schematic block diagram of an embodiment of the present invention.

Referring now to FIG. 1, signals $S_1$ and $S_2$ respectively are transmitted from transmitters 11a and 11b, which include modulators, to receivers 12a and 12b, which include demodulators, through transmitting switches 10a and 10b. Signals demodulated by receivers 12a and 12b are provided to demultiplexer equipment (not shown) through receiving switches 13a and 13b, as shown by S₃ and S₄. These routes constitute regular channels. A standby channel consists of a route which comprises a transmitter 11p and a receiver 12p. When the regular channels are in normal operation, a pilot signal from a pilot signal generator 14 is transmitted from the transmitter 11p to the receiver 12p through transmitting switches 10b and 10a and a connection line 8 to constantly monitor the standby route. The pilot signal demodulated by the receiver 12p passes through a connection line 9 and receiving switches 13a and 13b and is then detected by a pilot signal detector 15.

A switching operation from a regular channel to the standby channel is performed in the following manner. A fault of a regular channel is detected at the receiver 12a or 12b, and an alarm signal representing the fault is applied to a receiving control device 17 via a connection line 5. A transmitting control device 16 responsive to the alarm signal from the receiving control device 17 activates the transmitting switch 10a or 10b corresponding to the faulty channel to transmit signal $S_1$ or $S_2$ in parallel to the faulty and standby channels. The receiving control device 17, after verifying the signals being transmitted in parallel (that is, confirming that the pilot signal is not detected in the detector 15,) activates the receiving switch 13a or 13b in response to the output of the detector 15 to switch from the faulty regular channel to the standby channel. Thus, an extremely long time is required from the detection of the fault to the switchover, and therefore an enormous memory capacity is required to prevent data from being lost as discussed above. With this in view, the present invention is intended to eliminate only the data hit, or loss, during the receiving switchover operation which may result from the actual maintenance action. For further details of the switchover operation, reference should be made to the paper of Takeuchi et al.

FIGS. 2A and 2B show the structures of the receiving switches 13a and 13b; FIG. 2A shows a non-bridge type relay whereas FIG. 2B shows a bridge type relay. FIG. 2C shows a schematic circuit diagram of switches 13a and 13b. Reference letters A to D denote those terminals marked with corresponding reference characters at the switch 13a shown in FIG. 1. More particularly, letter A denotes the input for the regular channel; B, the output of the switch; C, the input for the standby channel; and D, the output for the pilot signal. As discussed above, the output of the non-bridge type shown in FIG. 2A becomes interrupted by the operation time lag between the two relays, whereas the bridge type shown in FIG. 2B may be switched without interruptions. However, in the system of FIG. 1 where a code format is bipolar, there is still concern of signal interruptions even with the bridge type relay because of the ambiguity in the signal polarity.

In FIG. 3, the reference numerals 101 and 201 denote a phase adjusting circuit to adjust the time lags for the demodulated signals a and a' from the regular and standby channels and clock signals b and b' to be recovered therefrom; 102 and 202, unipolar/bipolar (U/B) converters which respectively convert the outputs of receivers 12a or 12b and 12p (FIG. 1) to bipolar signals; 103, a phase comparator circuit to detect the time lag and the polarities of the outputs j and j' of the regular and standby channels; and 13, a receiving switch having a bridge type relay.

The U/B converters 102 and 202 respectively comprise ½ frequency dividers 104 and 204 which produce control signals e and e' for alternately reversing polarities of bipolar outputs j and j'. The U/B converters also comprise circuits 105 and 205 which, by control signals f and f', switch the polarities of the signals e and e' to be supplied to U/B converters 106 and 206 as bipolar polarity control signals p and p'. In response to the control signals p and p', circuits 106 and 206 in the U/B converters 102 and 202 convert unipolar signals c and c' into the bipolar signals j and j', respectively. The control signals f and f' are generated by, for example, manual switches, as described hereinafter. If the polarities of the signals j and j' are not coincident, either of the control signals f and f' will have its polarity reversed to invert the associated bipolar polarity control signal p or p', thereby to reverse the polarity of the associated signal j or j'.

During the maintenance servicing, although both regular and standby channels receive the same unipolar signals a and a', the polarities of the bipolar signals j and j' outputted from the two routes are not necessarily identical because they depend on the initial status of the polarity control circuits 104 and 204. Accordingly, if there exists no time lag between the unipolar signals c and c', there are four possible states as listed in the table below:

|  | Polarities of Signals e and e' | Polarities of Signals f and f' | Polarities of Signals j and j' |
|---|---|---|---|
| (I) | Coincidence | Coincidence | Coincidence |
| (II) | Coincidence | Non-coincidence (Reversed) | Non-coincidence (Reversed) |
| (III) | Non-coincidence (Reserved) | Coincidence | Non-coincidence (Reversed) |
| (IV) | Non-coincidence (Reversed) | Non-coincidence (Reversed) | Coincidence |

A phase comparator circuit 103 is arranged so that its output i becomes 0 volts when the two inputs supplied to each of phase comparators 107, 108 and 109 are respectively in coincidence, and +V volts when they are not, as shown in the following table corresponding to states (I) to (IV) of the above table:

|  | Output h | Output q | Output i |
|---|---|---|---|
| (I) | 0 | 0 | 0 |
| (II) | 0 | V | V |
| (III) | V | 0 | V |
| (IV) | V | V | 0 |

Thus, by monitoring the voltage of the output i from the phase comparator circuit 103, coincidence or non-coincidence of the bipolar outputs j and j' may easily be detected. Accordingly, if non-coincidence is detected, the polarity of either one of the control signals f and f' is reversed, resulting in coincidence of signals j and j'.

Figure 4:
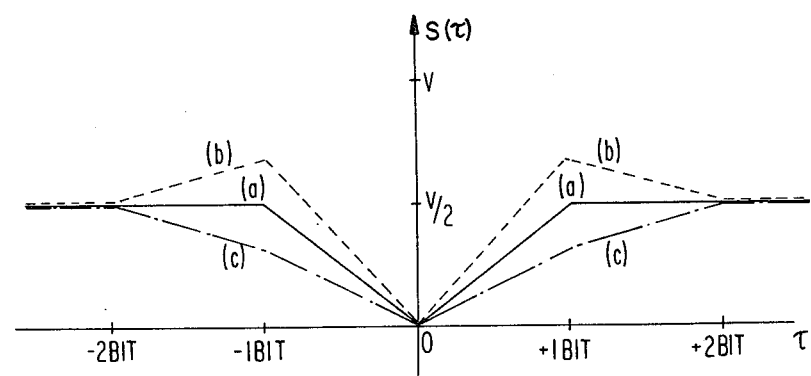
FIG. 4 is an output characteristic diagram of a phase comparator circuit of FIG. 3.

When there is a time lag $\tau$ between two routes, it is adjusted by seeking the correlation function between the signals e and e'. Assuming that the signal e is set as x(t), the signal e' becomes x(t+$\tau$), thus the autocorrelation function of x(t) is sought. Assuming that the output i is set at S($\tau$), it is given by:

$$S(\tau) = E[x(t) \oplus x(t+\tau)]$$

when the polarities of the signal e and e' are in coincidence, and $$S(\tau) = E[x(t) \oplus \overline{x(t+\tau)}]$$

when the polarities are in non-coincidence, wherein ⊕ indicates the exclusive "OR" operation when; x(t), reversal of $\overline{x(t)}$; and E[ ], a mean value of content of brackets, respectively. The output S(τ) becomes the following if a mark ratio (probability that the signal takes the logic level "1") of the received signals c or c' is assumed to be P, and the polarities of the signals e and e' are in coincidence:

$$S(\tau) = V \cdot \frac{\tau}{T} P : \text{when } |\tau| \leq T$$

$$S(\tau) = V \cdot \frac{\tau}{T}\left[\left(\frac{1}{2} - P\right) + \left(2P - \frac{1}{2}\right)\right] : \text{when } T \leq |\tau| \leq 2T$$

$$S(\tau) = V \cdot \frac{1}{2} : \text{when } |\tau| > 2T$$

wherein T indicates the time for 1 bit width. This is shown in FIG. 4. In the figure, the solid line (a) indicates $P = \frac{1}{2}$; the broken line (b), $P > \frac{1}{2}$; and the one dot chain (c), $P < \frac{1}{2}$. When polarities of signals e and e' are in non-coincidence, using the above formula for S(τ), output i is replaced by:

$$V - S(\tau)$$

in which case the diagram would be such that FIG. 4 is folded over symmetrically at a line S(τ)=V/2. Accordingly, by monitoring the DC voltage of the output i of the phase comparator circuit 103, the time lag may be adjusted by the phase adjusting circuit 101 in such a way that the DC voltage S(τ) would become minimum, or until it becomes maximum in which case the polarities of signals j or j' should be reversed.

When the time lags and the polarities of the outputs j and j' of the two routes are synchronized in the above manner, the output interruption caused by the mutual offseting during the switchover of the receiving switch 13 does not occur, and it becomes possible to achieve hitless switching operation except for a slight increase in an amplitude of a signal k.

Figure 5:
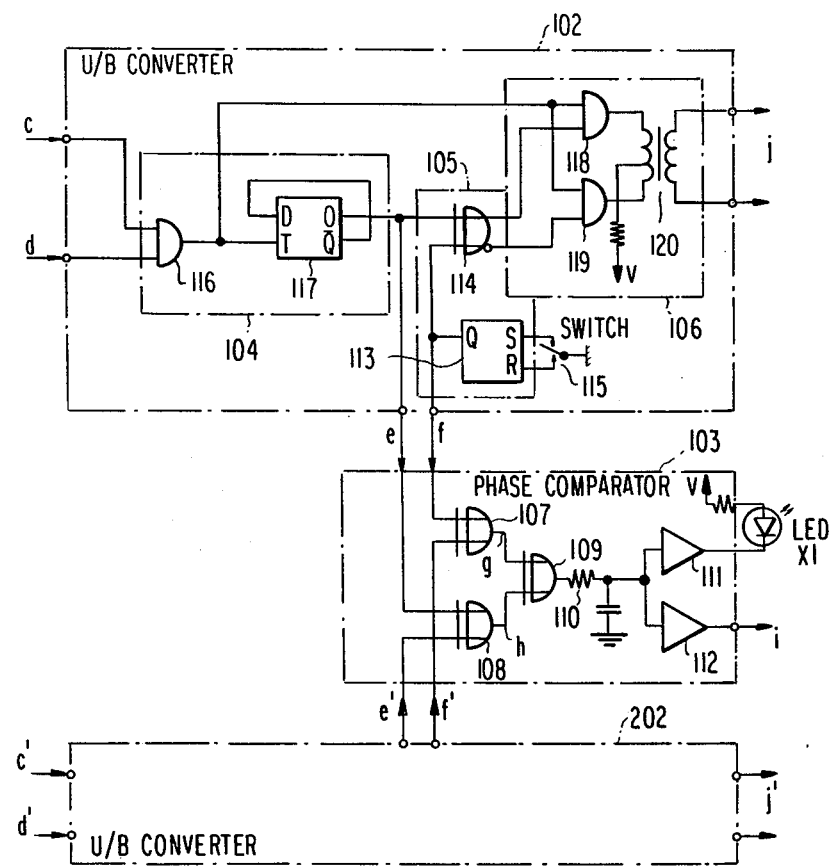
FIGS. 5 and 6 are schematic circuit diagrams of examples according to the present invention.

FIG. 5 shows a circuit diagram for an example of the present invention. A phase comparator circuit 103 includes exclusive OR gates 107 through 109 for phase comparison, a smoothing circuit 110 to smooth the comparator output, and DC amplifiers 111 and 112 to amplify the smoothened output. A polarity control signal generator circuit 104 for bipolar signals includes a D type flip-flop (F/F) 117 which divides the clock frequency into two, and an AND gate 116 to change the data duty cycles. A polarity reversing circuit 105 includes an F/F 113 which reverses its output in response to an external switch 115, and an exclusive OR gate 114 which controls the logic states of the bipolar polarity control signals (output of F/F 117) by providing the exclusive OR sum of the outputs of the F/F 113 and F/F 117 for ½ frequency division. A U/B converter 106 includes a polarity reverse transformer 120 and AND gates 118 and 119 to select the polarity of the transformer. If the output of the DC amplifier circuit 111 of the phase comparator 103 is connected to a light emitting diode (LED) $X_1$, the phase coincidence may be directly viewed by lighting up LED $X_1$. The procedures for achieving the hitless switching operation during the maintenance servicing will be described by way of the circuit shown in FIG. 5.

(a) Switchover from a regular channel to the standby channel:

(1) The transmission signal for the regular channel route to be maintained is transmitted in parallel to the standby channel route on the transmitting end.

(2) By monitoring the voltage of the output i (or LED $X_1$) of the phase comparator circuit 103 on the receiving end, the time lag between outputs of the two routes is adjusted by the phase adjusting circuit 101 (see FIG. 3) in order to keep the voltage of the output i to minimum (LED $X_1$ becomes lit), and the polarity of the bipolar signal is adjusted by the operation of the polarity reverse switch for U/B converter 202 of the standby route (although not shown, it has a similar structure as the switch 115 for the regular route).

(3) The receiving switch 13 (FIG. 3) is operated to switch to the standby route from the regular route so as to facilitate the maintenance servicing of the latter.

(b) Switchover from the standby channel to the regular channel:

(1) After servicing, by resuming the monitoring of the output i of the phase comparator circuit 103, the polarity reverse switch 115 of the U/B converter 102 for the regular route is turned to the opposite side if the polarities are in non-coincidence. If there are any time lags, the time is again adjusted.

(2) The receiving switch 13 is operated to switchover from the standby route to the regular route.

The switching apparatus according to the present invention comprises presently available device to which is added, for the purpose of achieving the hitless switching a polarity reversing circuit 105 and a simply constructed phase comparator circuit 103 which provides the comparison signal of e and f. Thus, it is simple to detect the time lag and the polarities as well as to achieve the polarity alignment. It then becomes possible to completely eliminate those interruptions in signal which may be caused by the switch-over. Moreover, this switching apparatus can automatically control the polarity by combining the receiving switch with the control signal for the receiving switch, particularly where the regular and the standby routes are provided on a 1:1 basis.

Figure 6:
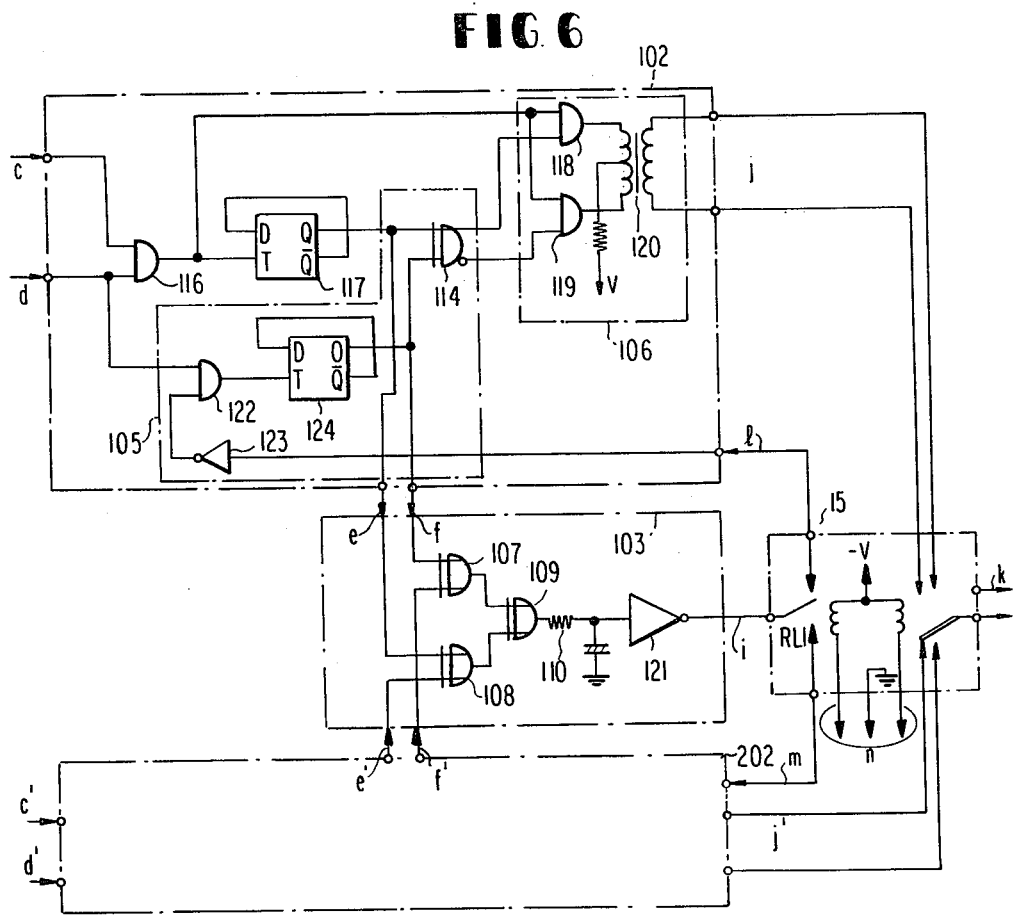

FIG. 6 is a circuit diagram showing an example where the regular and the standby routes are provided on a 1:1 basis. The time lag for the two routes is assumed to have been adjusted in advance. In this case, the output of the phase comparator circuit 103 is assumed to be at logic level "1" when the polarities are in coincidence. An additional relay $RL_1$ is provided in the receiving switch 15, to hold the reverse route which is contrary to the signal selected. The output i of the phase comparator circuit is to be distributed at the relay $RL_1$ to the regular and the standby routes. When the output i of an inverting amplifier 121 of the comparator circuit is connected to the regular input 1 as shown and also when the polarities are in non-coincidence, the unipolar/bipolar converter 106 triggered by a polarity reverse circuit 105' in order to make the polarities agree with each other and to achieve a stable status. The polarity reverse circuit 105' comprises an inverting amplifier 123, an AND gate 122 for synchronizing the switchover timing and the clocks, and an F/F 124 for the ½ frequency divider. When the logic 0 output from inveter 121 indicates non-coincidence, gate 122 will be enabled and clock d will cause the control signal f at the output of ff 124 to change state. This will result in coincidence and the logic 1 output from inverter 121 will then disable gate 122. Accordingly, it is possible to achieve automatic hitless switching by merely controlling the control signal n of the receiving switch 15 from the control device 17 of FIG. 1.

Figure 7:
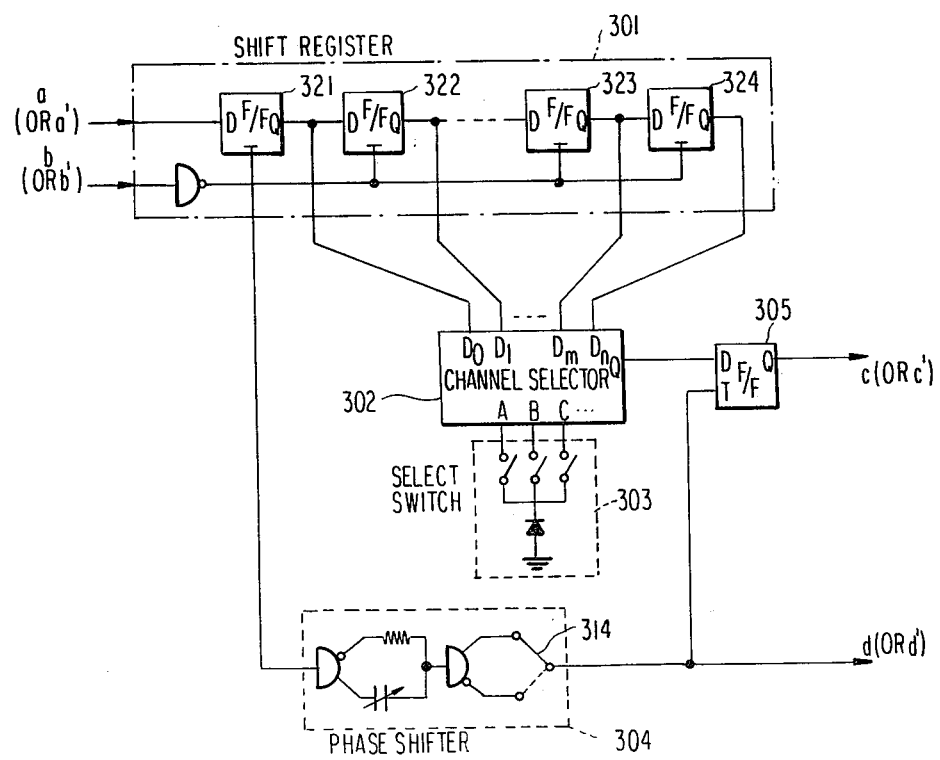
FIG. 7 is a schematic circuit diagram of phase regulator circuits shown in FIG. 3.

FIG. 7 shows one example of a phase adjusting circuit 101 or 201 when the data phase is to be delayed by N bits (wherein N is a positive integer). The input data a or a' and the clock b or b' are provided to an N-bit shift resister 301 comprising N number of F/F's 321 through 324 connected in cascade connection. Outputs Q of respective F/F's 321 through 324 are supplied to the input terminals $D_0$ through $D_n$ of a channel selector 302 which selects an output from out of these outputs Q in response to a first selection switch 303. The signal thus selected is read out as a read-out F/F 305 in synchronism with a read-out clock from a phase shifter 304. A phase shift circuit is thus constructed, and the input data a or a' is thus phase adjusted by a bit.

Fine tuning within 1 bit can be effected by adjusting the shift of the read-out clock b or b' by the phase shifter 304. The second selector switch 314 adjusts with 0.5 bit step. The logic circuits shown are current mode logic type.

What is claimed is:

1. A baseband data switching apparatus for alternately switching between first and second channels, each channel having means for receiving baseband unipolar data and clock recovering means for recovering a clock from said baseband unipolar data, said switching apparatus comprising:

first and second data phase adjusting means (301–303, 305) connected to the outputs of said receiving means and of said clock recovering means in said first and second channels, respectively, for adjusting the phase of said baseband unipolar data in each channel in a timed relationship with the respective recovered clocks;

first and second clock phase adjusting means (304) respectively connected to the output of said clock recovering means in said first and second channels for respectively adjusting the phases of said recovered clocks;

first (106) and second (206) unipolar/bipolar conversion means respectively connected to said first and second phase adjusting means and to said first and second clock phase adjusting means for respectively converting the phase-adjusted baseband unipolar data into bipolar data in response to a first control signal and to a second control signal, respectively;

first (104) and second (204) frequency divider means respectively connected to said first and second clock phase adjusting means for respectively dividing the frequencies of the phase adjusted recovered clocks;

first (105) and second (205) control signal supply means for respectively and selectively reversing the polarities of the outputs of said first and second frequency divider means in response to respective third and fourth control signals to provide said first and second control signals;

coincidence detecting means for detecting coincidence or non-coincidence between the outputs from said first and second unipolar/bipolar conversion means, said third and fourth control signals being produced in response to an output from said coincidence detecting means such that said third and fourth control signals have polarities which cause the polarities of said outputs from said first and second unipolar/bipolar conversion means to be coincident; and means for switching between the outputs of said first and second unipolar/bipolar conversion means.

2. A baseband data switching apparatus as claimed in claim 1 further comprising means for automatically providing said first and second control signals in response to the output from said coincidence detecting means.

3. A baseband data switching apparatus as claimed in claim 2, wherein said means for automatically providing said first and second control signals comprises:

means for providing said first and second control signals; and means for changing one of said first and second control signals in response to an output from said coincidence detecting means indicating non-coincidence between the outputs of said first and second unipolar/bipolar conversion means.

4. A baseband data switching apparatus as claimed in claim 3, wherein said means for providing said first and second control signals is a flip-flop which changes its output in response to a signal received at a clock terminal input, and wherein said means for changing comprises:

a gate having an output terminal coupled to the clock terminal of said flip-flop and an input terminal receiving a clock signal, said gate providing said clock signal to its output terminal when enabled; and means for enabling said gate in response to an output signal from said coincidence detecting means indicating non-coincidence between the outputs of said first and second unipolar/bipolar conversion means.

5. A baseband data switching apparatus as claimed in any one of claims 1–4, wherein said coincidence detecting means comprises means for detecting phase differences between the outputs of said first and second frequency divider means and between said third and fourth control signals.

6. A baseband data switching apparatus as claimed in claim 1, wherein said coincidence detecting means comprises:

a first Exclusive OR (EOR) gate (107) receiving said third and fourth control signals as inputs and providing an output;

a second EOR gate (108) receiving the outputs of said first and second frequency divider means as inputs; and a third EOR gate (109) receiving as inputs the outputs of said first and second EOR gates; and means for generating a d.c. voltage in accordance with the duty cycle of the output of said third EOR gate.

7. A baseband data switching apparatus as claimed in claim 6, further comprising indicator means energized by said d.c. voltage for indicating the coincidence of the outputs of said first and second unipolar/bipolar conversion means.

8. A baseband data switching apparatus as claimed in claim 1, wherein said first and second frequency divider means each comprise:

an AND gate receiving as inputs said phase-adjusted data and recovered clock signals; and a flip-flop having an output which changes in response to signals received at a clock terminal, the output of said AND gate being provided to said clock terminal and the output of said flip-flop comprising the output of said frequency divider means.

* * * * *